(12) United States Patent
Torno et al.

(10) Patent No.: US 6,220,232 B1
(45) Date of Patent: Apr. 24, 2001

(54) LOAD CONTROL IN AN INTERNAL COMBUSTION ENGINE

(75) Inventors: Oskar Torno, Schwieberdingen; Carsten Kluth, Stuttgart; Werner Häming, Neudenau; Iwan Surjadi, Vaihingen; Steffen Franke, Schwieberdingen; Michael Bäuerle, Markgröningen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/381,711

(22) PCT Filed: Nov. 28, 1997

(86) PCT No.: PCT/DE97/02780

§ 371 Date: Dec. 6, 1999

§ 102(e) Date: Dec. 6, 1999

(87) PCT Pub. No.: WO98/44252

PCT Pub. Date: Oct. 8, 1998

(30) Foreign Application Priority Data

Mar. 27, 1997 (DE) .............................. 197 12 861

(51) Int. Cl.$^7$ ............................................ F02B 33/00
(52) U.S. Cl. .................. 123/564; 60/600; 60/601; 60/602; 60/603
(58) Field of Search .................. 60/600, 601, 602, 60/603; 123/564; 364/571.02

(56) References Cited

U.S. PATENT DOCUMENTS

| | | | |
|---|---|---|---|
| 4,594,668 | * | 6/1986 | Fujawa et al. .................. 123/564 |
| 4,781,027 | * | 11/1988 | Richter et al. .................. 60/602 |
| 5,019,989 | * | 5/1991 | Ueda et al. .................. 123/564 |
| 5,298,845 | | 3/1994 | Deboer et al. .................. 60/602 |
| 5,551,235 | * | 9/1996 | Entenmann et al. .................. 60/602 |
| 5,782,092 | * | 7/1998 | Schultalbers et al. .................. 60/602 |
| 5,812,428 | * | 9/1998 | Zou et al. .................. 364/571.02 |
| 5,867,986 | * | 2/1999 | Buratti et al. .................. 60/602 |

FOREIGN PATENT DOCUMENTS

| | | |
|---|---|---|
| 35 30 579 | 3/1986 | (DE) . |
| 195 02 150 | 5/1996 | (DE) . |
| 2 267 978 | 12/1993 | (GB) . |

* cited by examiner

*Primary Examiner*—Thomas Denion
*Assistant Examiner*—Thai-Ba Trieu
(74) *Attorney, Agent, or Firm*—Kenyon & Kenyon

(57) ABSTRACT

To achieve a very sturdy automatic control of the boost pressure, the integration of system deviation of the boost pressure, which is carried out by an integrator, is limited to a predefinable limiting value. Limiting value is composed of a basic value and a correction value superimposed upon it. Correction value is determined adaptively as a function of speed, a plurality of speed ranges being predefined. Adapted correction value can be increased or reduced stepwise, which mainly depends on whether the integral-action component of the manipulated variable for the boost pressure is smaller or greater than the current limiting value.

10 Claims, 4 Drawing Sheets

LOAD CONTROL IN AN INTERNAL COMBUSTION ENGINE

FIELD OF THE INVENTION

The present invention relates to a method for automatically controlling the supercharging of an internal combustion engine, a manipulated variable being generated from the system deviation between a setpoint boost pressure and the actual boost pressure, a manipulated variable having at least one component provided by an integral-action controller, and a limiting value being predefined for the integral-action component, and being determined from a basic value that is dependent upon a plurality of operating parameters of the internal combustion engine, and a correction value superimposed thereon.

BACKGROUND OF THE INVENTION

A method of this kind is described in German Patent No. 195 02 250. The manipulated variable for the supercharger is composed of a proportional, a differential, and an integral-action component. The integral-action component is limited both in the steady-state and in the dynamic operation of the internal combustion engine. The limiting value of the integral-action component is composed of a basic value which is taken from characteristic curves as a function of operating parameters and a correction value superimposed upon the basic value. The correction value is adapted as a function of the charge-air temperature, the ambient pressure, and the speed of the internal combustion engine. Detailed information on the way of adapting the correction value cannot be gathered from German Patent No. 195 02 250.

SUMMARY OF THE INVENTION

An object of the present invention is to specify a method which enables a very sturdy automatic control of the supercharging of an internal combustion engine, particularly, if extremely variable disturbances appear, for example, heavily varying boost pressure setpoint values at full load or in the case of a highly variable speed dynamics.

The object of the present invention is achieved by adaptively determining the correction value as a function of the speed, a plurality of speed ranges being predefined. The adapted correction value is reduced stepwise if the system deviation is smaller than a threshold and if the integral-action component is smaller than the current limiting value. A stepwise increase in the adapted correction value occurs if the system deviation is greater than zero and if the integral-action component is equal to or greater than the current limiting value.

Using a correction value generated for the limiting value of the integral-action component in this manner, it is possible to avoid heavy overshoots during the boost pressure control, and still achieve a quick transient response of the controller. Especially, in very powerful vehicles, which are frequently driven in the dynamic operation, an excellent control response of the boost pressure control is achieved by the method according to the present invention because of its good adaptability of the limiting value for the integral-action component of the manipulated variable. Using the method of the present invention, tolerances in the control loop are reliably mastered.

DETAILED DESCRIPTION

Figure 1:
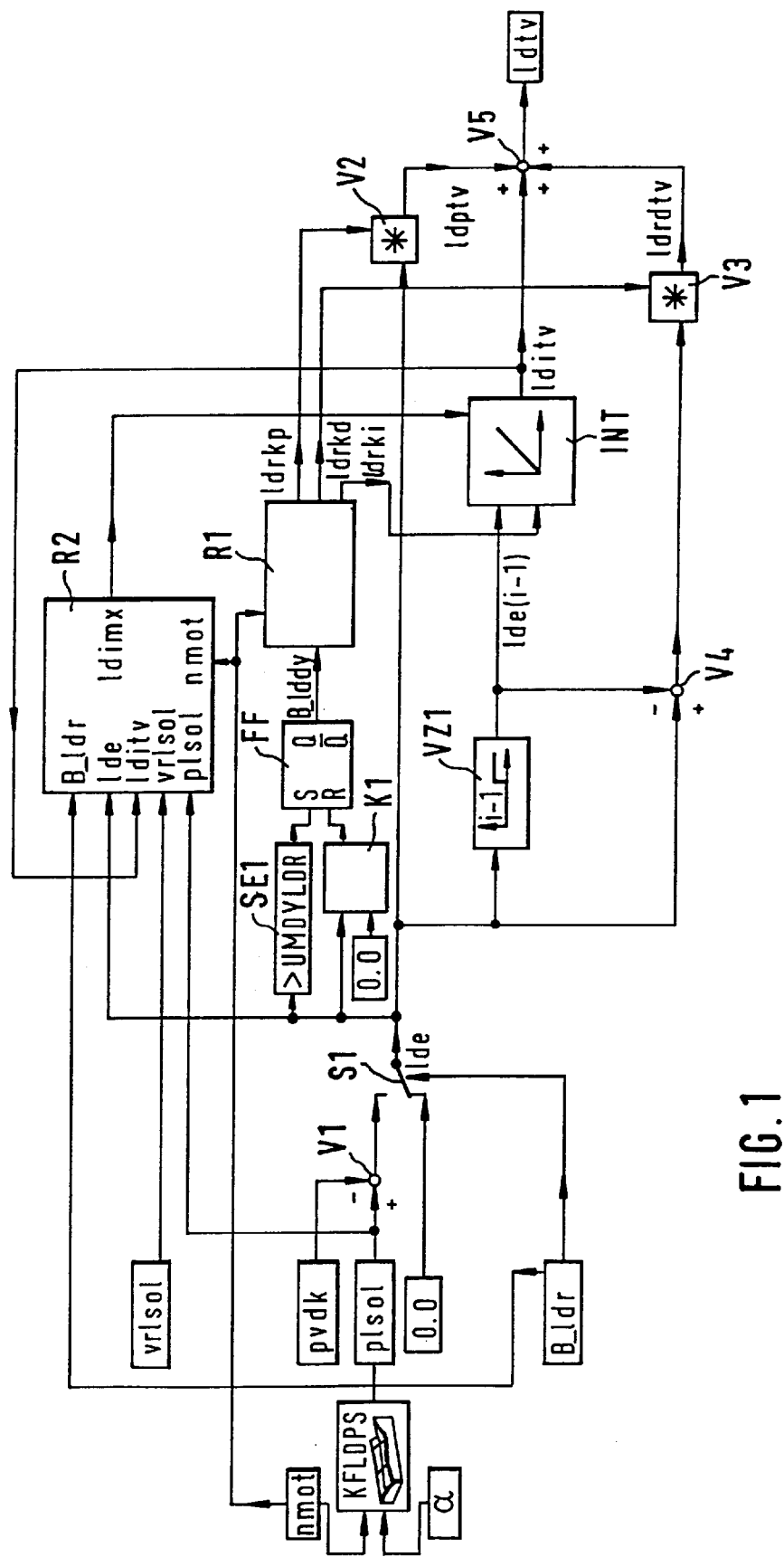
FIG. 1 shows a flow chart of a boost pressure controller according to the present invention.

As can be gathered from the flow chart of FIG. 1, a setpoint boost pressure plsoll is read out from a characteristic map KFLDPS as a function of the engine speed nmot and the throttle-valve position $\alpha$. Moreover, the actual boost pressure pvdk is measured by a pressure sensor upstream of the throttle valve. In a logic node V1, the difference between the setpoint boost pressure plsoll and the actual boost pressure pvdk is determined. This difference is referred to as system deviation lde. If the condition B_ldr for activating the boost pressure control is present, then a switch S1 is connected to the output of logic node V1 so that the mentioned difference between the setpoint boost pressure plsoll and the actual boost pressure pvdk is present at the output of switch S1 as system deviation lde. If the boost pressure control is not active, i.e., condition B_ldr not given, switch S1 is connected to 0.0. Therefore, the system deviation is zero in this case.

A threshold discriminator SE1 applies a logical 1 to the S-input of an SR-flipflop FF if system deviation lde exceeds a threshold UMDYLDR. The R-input of the RS-flipflop FF is connected to the output of a comparator K1. This comparator K1 emits a logical 1 if system deviation lde is smaller than or equal to 0.0. Under the indicated circumstances, a logical 1 is present at output Q of RS-flipflop FF if system deviation ide exceeds threshold UMDYLDR, i.e., a transition from the steady-state to the dynamic operation takes place. If a logical 1 is present at the R-input of RS-flipflop FF, i.e., system deviation lde is smaller than 0 (the actual boost pressure is higher than the setpoint boost pressure), then flipflop FF is reset, and a logical 0 is present at its output Q. Output signal B_lddy at output Q of flipflop FF indicates whether dynamic operation (logical 1) or steady-state operation (logical 0) is given.

In functional block R1, a proportional ldrkp, a differential ldrkd, and an integral-action control parameter ldrki are determined as a function of operating condition B_lddy and engine speed nmot. The determination of control parameters ldrkp, ldrkd, ldrki in functional block R1 is still described below on the basis of FIG. 2.

By forming the product of proportional control parameter ldrkp and system deviation lde in multiplier V2, a proportional component ldptv is formed for manipulated variable ldtv of the turbocharger.

In multiplier V3, a differential component ldrdtv for manipulated variable ldtv results from the formation of the product of differential control parameter ldrkd and the offset between current system deviation lde and system deviation lde(i−1) which has been determined one time cycle before (approx. 50 ms). The difference between the current system deviation lde and system deviation lde(i−1), which has been determined before, is formed in logic node V4. System deviation lde(i−1), which is delayed by one time cycle, is furnished by a time-delay element VZ1.

The integral-action component lditv for manipulated variable ldtv is formed by an integrator INT which calculates the product of the integral-action control parameter ldrki and the delayed system deviation lde(i−1), and superimposes this product upon the integral-action component lditv(i−1) which has been determined in the preceding time cycle.

In logic node V5, finally, proportional component ldptv, differential component ldrdtv, and integral-action component lditv are added, resulting in manipulated variable ldtv for a blow-off valve of the turbocharger.

Integral-action component lditv is limited toward the top to avoid overshoots during the boost pressure control. The limiting value ldimx for the integral-action component lditv is determined in a circuit block R2, which is described below on the basis of FIG. 3, to be more precise, as a function of system deviation lde, integral-action component lditv, setpoint boost pressure plsol, engine speed nmot, and the ratio between the setpoint charge and the maximum charge of the cylinders vrlsol.

Figure 2:
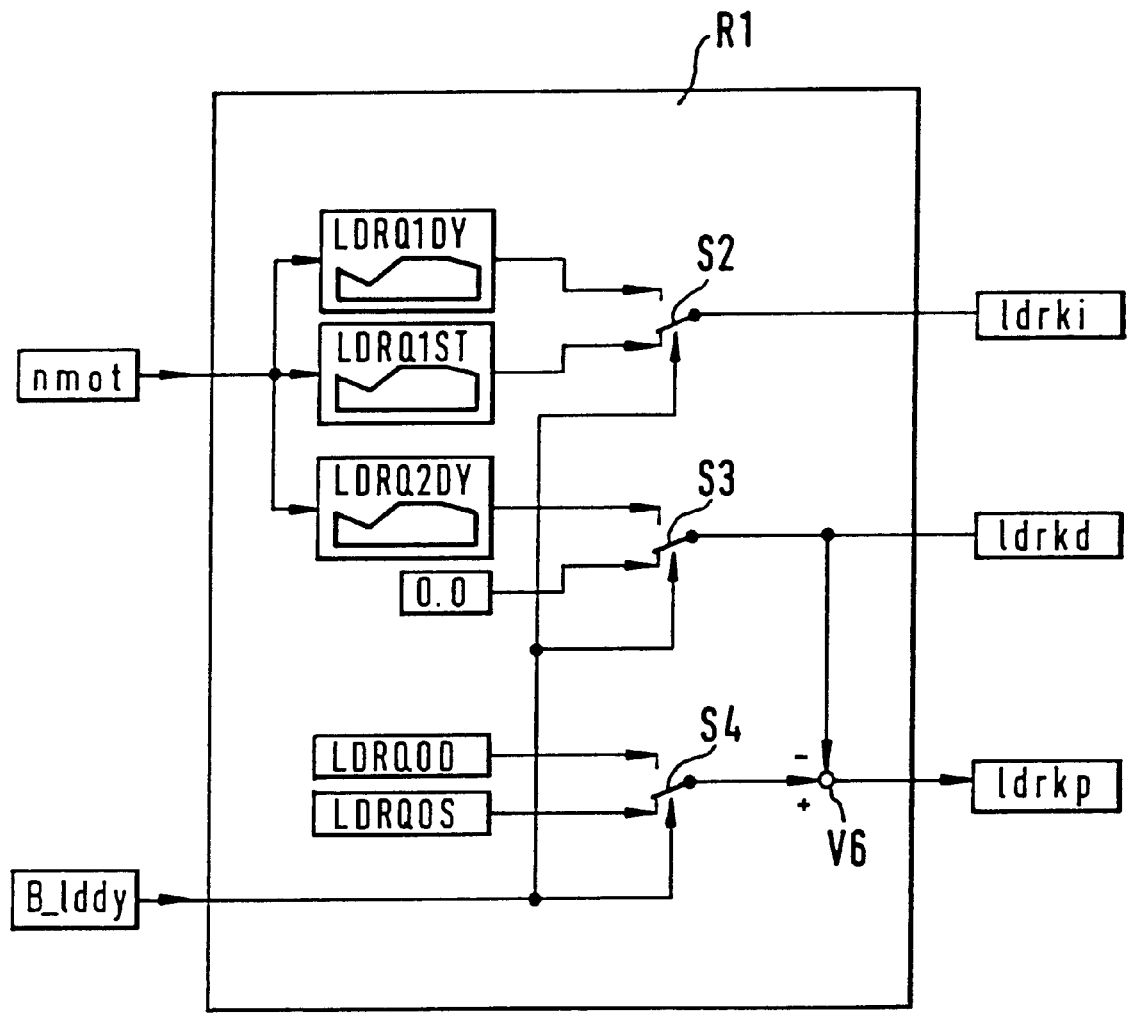
FIG. 2 shows a flow chart on the determination of controller parameters.

Functional block R1, which is shown in FIG. 2, contains three characteristics fields LDRQ1DY, LDRQ1ST, and LDRQ2DY which are dependent upon engine speed nmot. If the condition B_lddy for dynamic operation is present, then integral-action control parameter ldrki is switched through from characteristic curve LDRQ1DY for dynamic operation to the output by switch S2. Differential control parameter ldrkd is switched through from characteristics field LDRQ2DY to the output by switch S3. Proportional control parameter ldrkp results from the formation of the difference, in logic node V6, between a fixed value LDRQOD, which is switched through to logic node V6 by a switch S4, and differential control parameter ldrkd. If the condition B_lddy for dynamic operation is not present, but the engine is in steady-state operation, then integral-action control parameter ldrki is taken from characteristic curve LDRQ1ST; now, switch 2 connects to characteristic curve LDRQ1ST accordingly. Differential control parameter ldrkd is connected to 0.0 via switch S3, and proportional control parameter ldrkp is set to a fixed value LDRQOS by switch S4. By tests on the bench dynamometer, fixed values LDRQOD, LDRQOS, and characteristic curves LDRQ1DY, LDRQ1ST, and LDRQ2DY are adapted in such a manner that the supercharging control is optimized in the dynamic and steady-state operating condition.

Figure 3:
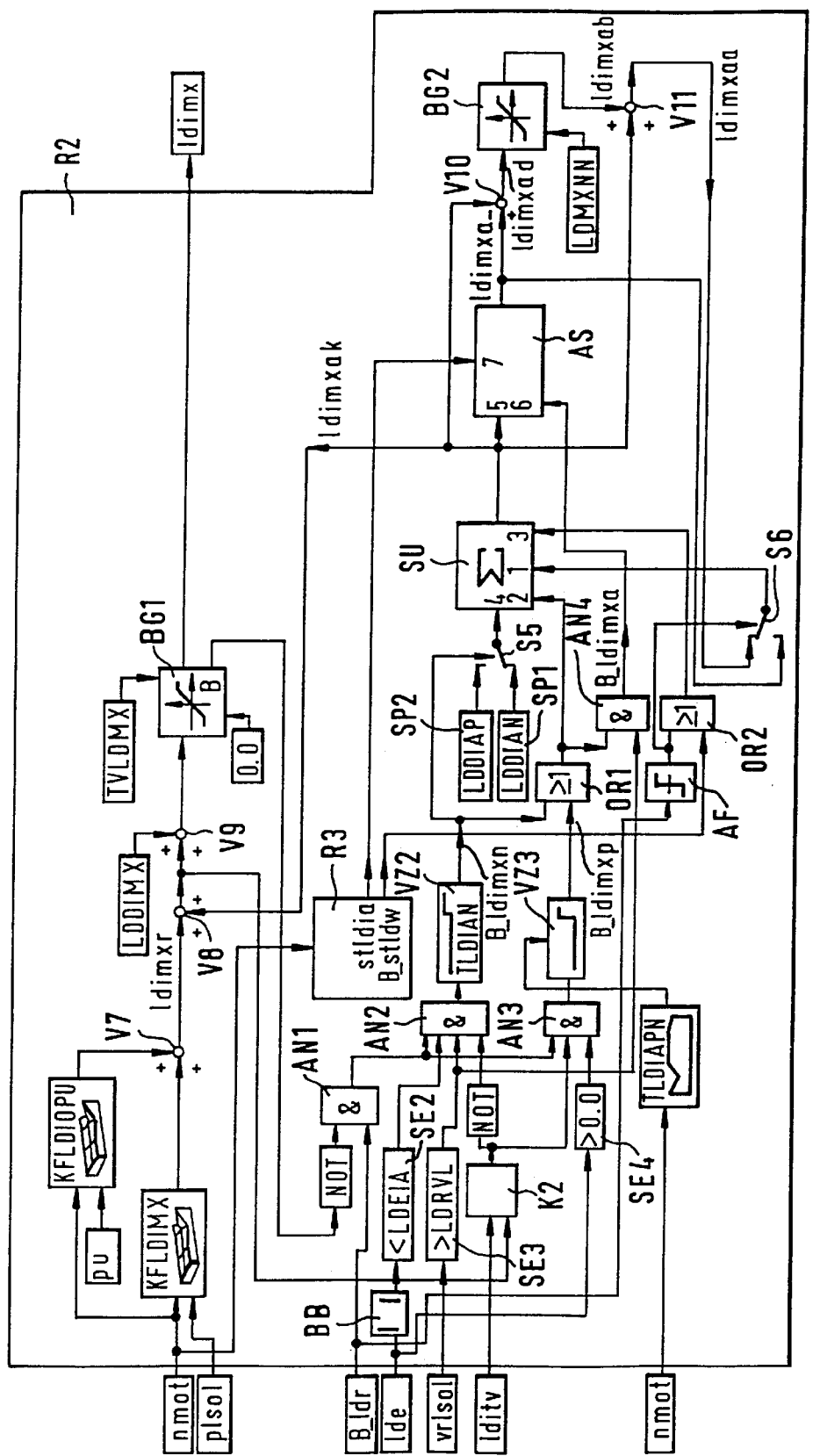
FIG. 3 shows a flow chart on the determination of a limiting value for an integral-action component of a boost pressure manipulated variable.

FIG. 3 shows functional block R2 which derives the limiting value ldimx for the integral-action component lditv from engine speed nmot, setpoint boost pressure plsol, system deviation lde, the ratio between the setpoint charge and the maximum charge of the cylinders vrlsol, and integral-action component lditv of the manipulated variable.

Limiting value ldimx is composed of a basic value ldimxr and a correction value ldimxak superimposed thereon in logic node V8. In addition, a further, definitely preset value LDDIMX can be added to limiting value ldimx in logic node 9. This value LDDIMX corresponds to a small fraction (approx. 0 . . . 5%) of limiting value ldimx, which ensures that this small value is not undershot on any account. If the current integral-action component is greater than the limiting value without the value LDDIMX, which represents a safety distance, then the boost pressure can be controlled spontaneously even without raising the limiting value, provided that the boost pressure deviation to be compensated is not greater than safety distance LDDIMX.

A limiting stage BG1 limits limiting value ldimx to a predefinable value TVLDMX, which corresponds to, for example, 95% of the pulse duty factor of the manipulated variable for the boost pressure control.

The current correction value ldimxak for limiting value ldimx appears at the output of a summer SU. In this summer SU, the correction value, which is present at its input 1, is, on certain conditions, either reduced stepwise, or increased stepwise.

In order that a stepwise reduction in the correction value is carried out in summer SU, the following conditions are to be fulfilled:

The boost pressure control must be active, i.e., the condition B_ldr must be set, and the current limiting value ldimx must not be at the upper or lower end of limiting stage BG1. Both data are applied to the inputs of an AND gate AN1 which emits a logical 1 to a further AND gate AN2 if the indicated two conditions are fulfilled. A further condition is that the amount of deviation lde must be smaller than a threshold LDEIA. For that, system deviation lde is fed to an absolute-value generator BB and, subsequently, to a threshold discriminator SE2 which, at its output, emits a logical 1 to AND gate AN2 if the amount of the system deviation is below threshold LDEIA. This threshold LDEIA is nearly 0.

Furthermore, it is checked in a threshold discriminator SE3 whether the ratio between the setpoint charge and the maximum charge of the cylinders vrlsol is above a threshold LDRVL. If this is the case, the engine is in full-load operation, and threshold discriminator SE3 emits a logical 1 to an input of AND gate AN2.

The last condition to be fulfilled would be that integral-action component lditv is smaller than limiting value ldimx. A comparator K2 compares integral-action component lditv of the manipulated variable and limiting value ldimx upstream of logic node V9 accordingly. At the output of comparator K2, a logical 1 appears if integral-action component lditv is greater than limiting value ldimxr. Via an inverter NOT, the output signal of comparator K2 reaches an input of AND gate AN2. Consequently, a logical 1 is present at this input of AND gate AN2 if integral-action component lditv is smaller than limiting value ldimx.

If all indicated conditions are fulfilled, a logical 1 is present at the output of AND gate AN2. This condition B_ldimxn for a negative, stepwise adjustment of the correction value in summer SU is, delayed by a fixed debouncing time TLDIAN in a time-delay element VZ2, fed to a switch S5 and to an OR-gate OR1. If the condition B_dimxn for a negative, stepwise adjustment of the limiting value is given, then switch S5 connects input 4 of summer SU to a read-only memory SP1 in which step size LDDIAN for the negative adjustment of the limiting value is stored. If condition B_ldimxn is not fulfilled (corresponds to a logical 0 at the output of AND gate AN2), then switch S5 switches to a memory SP2 in which step size LDDIAP for a positive adjustment of the limiting value is stored.

For a stepwise, positive adjustment of the limiting value, the following three conditions must be fulfilled:

As already in the case of the negative stepwise adjustment, a logical 1 must be present at the output of AND gate AN1, as described above.

Moreover, system deviation lde must be greater than 0, a very small variance from 0 being sufficient already. A threshold discriminator SE4 generates a logical 1 at its output if this condition is fulfilled.

Finally, the current integral-action component lditv of the manipulated variable must be greater than current limiting value ldimx. As already described earlier, this condition is checked using comparator K2.

Both the output of comparator K2 and the output of threshold discriminator SE4, and the output of AND gate AN1 are connected to an AND gate AN3. A logical 1 is present at its output if the three conditions indicated above are fulfilled.

The output signal of AND gate AN3, the condition B_ldimxp for the stepwise positive adjustment of the correction value, is led via a time-delay element VZ3 whose delay time is equal to a debouncing time which is taken from a characteristic curve TLDIAPN that is dependent upon the engine speed nmot. The condition B_dimxn for the negative stepwise adjustment of the correction value and the condition B_ldimxp for the positive stepwise adjustment are both applied to the inputs of an OR-gate OR1. Its output signal, which is applied to input 2 of summer SU, signals summer SU whether a positive or negative adjustment of the limiting value which is present at its input 1 is to be carried out.

The correction value ldimxak which is present at the output of summer SU is also fed to an input 5 of a functional block AS in which an adaptation of the correction value takes place. This adaptation is carried out only if, on one hand, the engine is in full-load operation, and, on the other hand, the condition for a positive or a negative stepwise adjustment of the correction value is fulfilled. Information about the full-load operation can be tapped off at the output of threshold discriminator SE3 described above. The information on whether a positive or stepwise adjustment of the correction value is carried out can be taken from the output signal of OR-gate OR1. Both the output signal of threshold discriminator SE3 and the output signal of OR-gate OR1 are fed to the inputs of an AND gate AN4. If both indicated conditions are fulfilled, the output signal B_ldimxa of AND gate AN4 is a logical 1. The condition B_ldimxa for an adaptation of the correction value is applied to input 6 of functional block AS. Each time the condition B_ldimxa is =1, the current value of summer SU is transferred to a corresponding memory location of functional block AS in which a plurality of values simulating an adaptation characteristic are stored.

Interpolation points stldea for the adaptation of the correction value in functional block AS are provided by a functional block R3 which is still described below on the basis of FIG. 4. In addition, functional block R3 emits information B_stldw about interpolation point changes.

Fed to an input 1 of summer SU for forming correction value ldimxak is either adapted correction value ldimxa from the output of functional block AS or an adapted correction value ldimxaa in the case of which step changes occurring in the negative direction have been reduced to a minimum value. The selection between adapted correction value ldimxa and limited adapted correction value ldimxaa is made via a switch 6. Switch 6 switches to the unlimited adapted correction value ldimxa at the beginning of the activation of the boost pressure control, that is, immediately after a rising edge of condition B_ldr for the boost pressure control appears. The rising edge of condition B_ldr is detected by a flipflop AF. Otherwise, switch S6 is in the other position and feeds limited adapted correction value ldimxaa to input 1 of summer SU.

An input 3 of summer SU receives the information from the output of an OR-gate OR2 whether a rising edge of boost pressure activation signal B_ldr is present or whether signal B_stldw indicates interpolation point changes in functional block R3.

Limited adapted correction value ldimxaa is formed as follows. In a logic node V10, current correction value ldimxak, which is emitted by summer SU, is subtracted from adapted correction value ldimxa, which is present at the output of functional block AS. Differential signal idimxad is fed to a limiting stage BG2. Limiting stage BG2 limits negative step changes in differential signal ldimxad to a predefined limiting value LDMXNN. Limited differential signal ldimxab at the output of limiting stage BG2 is added to current correction value ldimxak again in logic node V11, finally resulting in limited adapted correction value ldimxaa.

Figure 4:
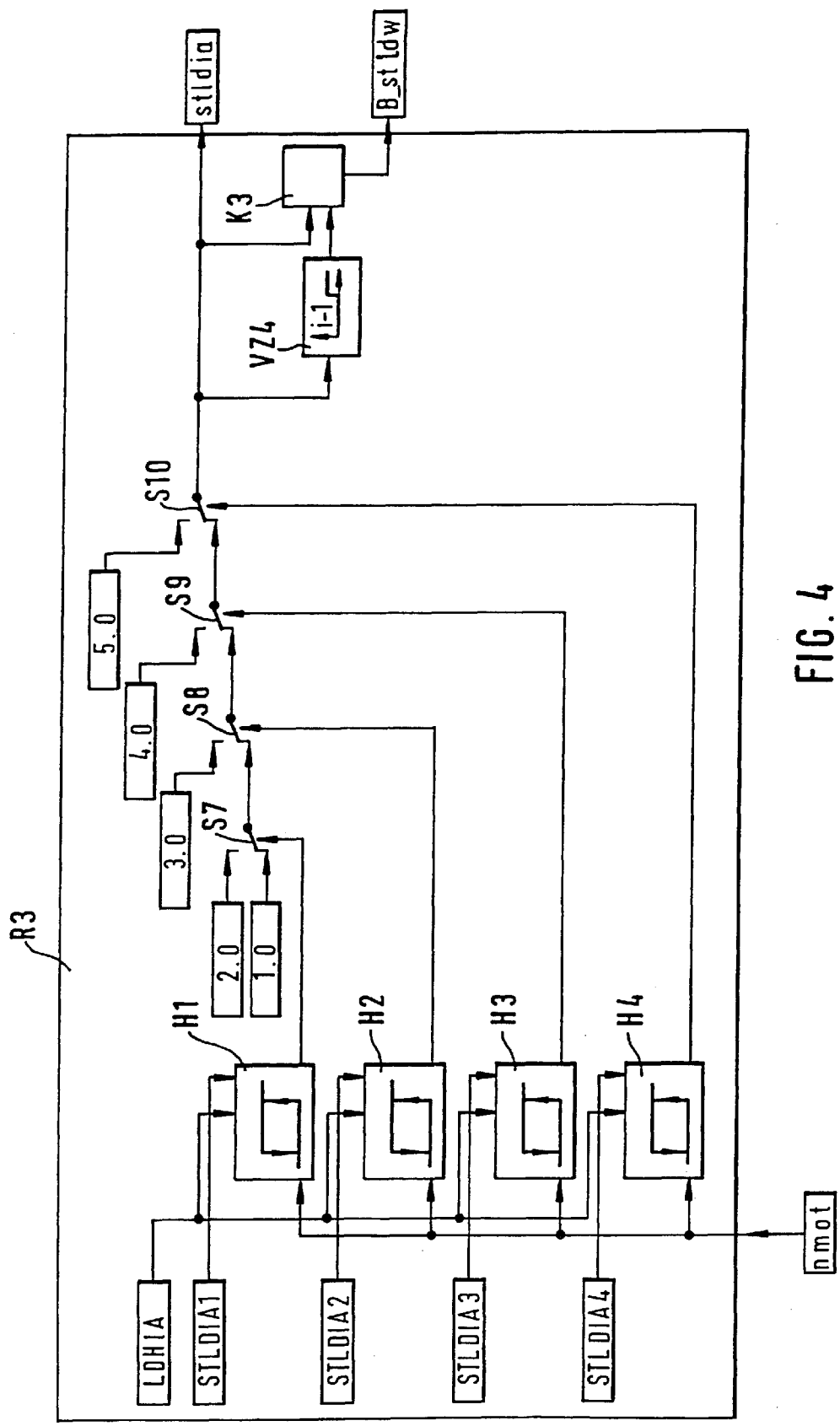
FIG. 4 shows a flow chart on the speed-dependent adaptation of a correction value for the limiting value.

FIG. 4 reveals how the interpolation points sdldea are formed, which are fed to functional block AS at input 7 for the adaptation. Provided are, for example, four circuits H1, H2, H3, and H4 which generate a hysteresis. A hysteresis constant LDHIA, which is applied to all circuits H1 through H4, predefines the hysteresis width. The hystereses of the four circuits H1 through H4 are distributed with regard to speed nmot in such a way that each hysteresis covers one of four speed ranges. This speed-dependent position of the individual hystereses is input into individual hysteresis circuits H1 through H4 via constants STLDIA1, STLDIA2, STLDIA3, and STLDIA4. Depending on which of the four speed ranges the current speed nmot is in, a signal emerges at the output of hysteresis circuit H1, or H2, or H3, or H4. Each of the output signals controls a switch S7, S8, S9, and S10. Applied to the inputs of switches S7, S8, S9, and S10 are five supporting interpolation values 1.0, 2.0, 3.0, 4.0, and 5.0. Depending on the switch position, i.e., as a function of the current speed range nmot, one of the five interpolation points is switched through as output signal stldia and reaches input 7 of adaptation circuit AS. Depending on the magnitude of the interpolation point stldea, the steepness of the adaptation characteristic is increased or reduced; consequently, adapted correction value ldimxa becomes higher or lower due to the adaptation.

In hysteresis circuits H1 . . . H4, there is a right switching point STLDIA1 . . . 4 and a left switching point STLDIA1 . . . 4–LDHIA. In response to increasing speed, i.e., when nmot≧STLDIA1 . . . 4, the output of the respective hysteresis circuit H1 . . . H4 is switched to "1". Subsequently, a reset to "0" follows if nmot≦STLDIA1 . . . 4–LDHIA.

The information about interpolation point change B_stldw is obtained with the assistance of a comparator K3. This compares current interpolation point value stldia with interpolation point value stldia (i–1) which is determined one time cycle before. A time-delay element VZ4 makes the preceding supporting interpolation value stldia(i–1) available to comparator K3. If the two interpolation point values stldia and stldia (i–1), which are applied to the inputs of comparator K3, differ from each other, then comparator K3 emits the information about an interpolation point change B_stldw at its output.

What is claimed is:

1. A method for automatically controlling a supercharging procedure of an internal combustion engine, comprising the steps of:

determining a system deviation between a setpoint boost pressure and an actual boost pressure of the internal combustion engine;

generating a manipulated variable as a function of the system deviation;

providing at least one integral-action component by an integral-action controller;

defining a current limiting value for the at least one component as a function of a basic value and a correction value, the basic value being dependent upon a plurality of operating parameters of the internal combustion engine, the correction value being superimposed on the basic value;

adaptively determining the correction value as a function of a speed of the internal combustion engine, a plurality of speed ranges being predefined;

decreasing the determined correction value in a stepwise manner if the system deviation is smaller than a predetermined threshold value and if the at least one component is smaller than the defined limiting value; and increasing the determined correction value in a stepwise manner if the system deviation is greater than zero and if the at least one component is equal to or greater than the defined limiting value.

2. The method according to claim 1, further comprising the step of:

performing the decreasing step only if the internal combustion engine is in a full-load operation and if the defined limiting value is not at a predetermined lower threshold of the manipulated variable.

3. The method according to claim 1, further comprising the step of:

performing the increasing step only if the defined limiting value is not at a predetermined upper threshold of the manipulated variable.

4. The method according to claim 1, further comprising the step of:

adding a predetermined fixed amount to the defined limiting value, the predetermined fixed amount being approximately between 0% and 5% of a predetermined upper threshold of the manipulated variable.

5. The method according to claim 1, further comprising the step of:

delaying a performance of the increasing step by a first debouncing time after the system deviation is greater than zero and the at least one component is equal to or greater than the defined limiting value.

6. The method according to claim 1, further comprising the step of:

delaying a performance of the decreasing step by a second debouncing time after the system deviation is smaller than a threshold value and the at least one component is smaller than the defined limiting value.

7. The method according to claim 5, wherein the first debouncing time is a predefined value.

8. The method according to claim 6, further comprising the step of:

determining the second debouncing time using a characteristic curve which is dependent from the speed.

9. The method according to claim 1, further comprising the steps of:

limiting changes of a reduction of the determined correction value to a predetermined minimum value, the changes being limited in response to a change from one of the plurality of ranges of the speed to another one of the plurality of ranges of the speed; and stopping the limiting step after a boost pressure control is activated.

10. The method according to claim 1, further comprising the step of:

determining the basic value, using characteristic maps, as a function of the speed, the setpoint boost pressure and an ambient pressure.

* * * * *